United States Patent
Lu et al.

(10) Patent No.: US 12,127,157 B2
(45) Date of Patent: Oct. 22, 2024

(54) METHODS, SYSTEMS, AND NON-TRANSITORY MEDIUMS FOR AUGMENTED FINE TIME MEASUREMENT

(71) Applicant: Toyota Motor Engineering & Manufacturing North America, Inc., Plano, TX (US)

(72) Inventors: Hongsheng Lu, San Jose, CA (US); Hansi Liu, New Brunswick, NJ (US); Rui Guo, San Jose, CA (US); Takayuki Shimizu, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 320 days.

(21) Appl. No.: 17/568,078

(22) Filed: Jan. 4, 2022

(65) Prior Publication Data
US 2023/0217408 A1   Jul. 6, 2023

(51) Int. Cl.
*H04W 64/00* (2009.01)
*H04W 24/10* (2009.01)
(Continued)

(52) U.S. Cl.
CPC ......... *H04W 64/006* (2013.01); *H04W 24/10* (2013.01); *H04W 28/06* (2013.01); *H04W 56/009* (2013.01)

(58) Field of Classification Search
CPC ... H04W 64/00; H04W 4/023; H04W 64/003; H04W 4/02; H04W 4/029; H04W 24/10; H04W 4/025; H04W 84/12; H04W 88/02; H04W 56/001; H04W 4/33; H04W 4/80; H04W 40/20; H04W 40/244; H04W 56/00; H04W 92/18; H04W 84/10; H04W 56/0015; H04W 16/28; H04W 8/005;
(Continued)

(56) References Cited

U.S. PATENT DOCUMENTS

| 2017/0280439 A1 | 9/2017 | Zhang et al. |
| 2020/0018816 A1* | 1/2020 | Alexander ............ G01S 5/0218 |
| 2021/0282108 A1* | 9/2021 | Smith .................. H04B 7/0626 |

FOREIGN PATENT DOCUMENTS

| CN | 102811494 A | 12/2012 |
| CN | 104852831 A | 8/2015 |

(Continued)

OTHER PUBLICATIONS

A machine learning approach for Wi-Fi RTT ranging (https://www.researchgate.net/publication/329887019_A_Machine_Learning_Approach_for_Wi-Fi_RTT_Ranging), Jan. 2019.
(Continued)

*Primary Examiner* — Kwasi Karikari
(74) *Attorney, Agent, or Firm* — Dinsmore & Shohl LLP (57) ABSTRACT

A method for measuring a distance is provided. The method includes receiving a fine time measurement (FTM) message, extracting channel state information (CSI) from the FTM message, determining with a channel condition classifier a probability that the FTM message is multi-path based on the corresponding CSI, and discarding the FTM message in response to the probability that the FTM message is multi-path is above a threshold level of probability.

19 Claims, 6 Drawing Sheets

(51) Int. Cl.
 *H04W 28/06* (2009.01)
 *H04W 56/00* (2009.01)
(58) Field of Classification Search
 CPC ........... H04W 56/0095; H04W 56/002; H04W 72/54; H04W 72/542; H04W 56/0075; H04W 52/0229
 See application file for complete search history.

(56) References Cited

FOREIGN PATENT DOCUMENTS

| | | |
|---|---|---|
| CN | 106131958 A | 11/2016 |
| CN | 106772219 A | 5/2017 |
| KR | 20170116054 A | 10/2017 |

OTHER PUBLICATIONS

Verification: Accuracy Evaluation of WiFi Fine Time Measurements on an Open Platform (https://dl.acm.org/doi/pdf/10.1145/3241539.3241555), Oct. 2018.

* cited by examiner

METHODS, SYSTEMS, AND NON-TRANSITORY MEDIUMS FOR AUGMENTED FINE TIME MEASUREMENT

TECHNICAL FIELD

The present disclosure generally relates to wireless networks, and more particularly to Wi-Fi ranging.

BACKGROUND

A computer network may be a wireless local area network (WLAN) formed by one or more access points (APs) operating under one or more of the IEEE 802.11 a/b/g/n/ac/ax wireless standards that provide the basis for wireless networking products under the Wi-Fi brand. The IEEE 802.11mc addition to the wireless standards includes additional minor features such as fine time measurement (FTM) for Wi-Fi ranging. Wi-Fi ranging is the process of determining the distance between a device and AP based on Wi-Fi signals. FTM provides precise time measurements to devices to enable them to measure the time a packet takes to make a round trip between the device and the access point (i.e., the "round trip time" (RTT)).

However, measuring RTT to determine the distance to an access point can be unreliable due to radiofrequency propagation anomalies. Particularly, multi-path interference is a phenomenon associated with wave propagation that occurs when the receiver receives multiple copies of the transmitted signal that each travel a different path, which causes interference at the receiver. Such multi-path interference can introduce noise into the RTT measurements of 802.11mc Wi-Fi ranging and thus decrease the accuracy of the range estimate.

Therefore, intelligent strategies for improving the accuracy of Wi-Fi ranging that can overcome multi-path interference are desired.

SUMMARY

In accordance with one embodiment of the present disclosure, a method includes receiving a fine time measurement (FTM) message, extracting channel state information (CSI) from the FTM message, determining with a channel condition classifier a probability that the FTM message is multi-path based on the corresponding CSI, and discarding the FTM message in response to the probability that the FTM message is multi-path is above a threshold level of probability.

In accordance with another embodiment of the present disclosure, a system includes a controller programmed to perform operations comprising receiving an FTM message, extracting CSI from the FTM message, determining with a channel condition classifier a probability that the FTM message is multi-path based on the corresponding CSI, and discarding the FTM message in response to the probability that the FTM message is multi-path is above a threshold level of probability.

In accordance with yet another embodiment of the present disclosure, a non-transitory medium includes machine-readable instructions that, when executed by a processor, cause the processor to perform operations including receiving an FTM message, extracting CSI from the FTM message, determining with a channel condition classifier a probability that the FTM message is multi-path based on the corresponding CSI, and discarding the FTM message in response to the probability that the FTM message is multi-path is above a threshold level of probability.

Although the concepts of the present disclosure are described herein with primary reference to Wi-Fi, it is contemplated that the concepts will enjoy applicability to any time-of-flight-based localization methods.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include methods, systems, and non-transitory mediums having machine-readable instructions for improving the accuracy of the fine time measurement (FTM) protocol. The problem with current Wi-Fi ranging under 802.11mc is its unreliability due to noise introduced by multi-path interference in round trip time (RTT) measurements. Embodiments of the present disclosure may perform augmented FTM by determining which RTT measurements are noise and discarding them to allow for a cleaner average RTT measurement and thus a more accurate ranging calculation.

Figure 1:
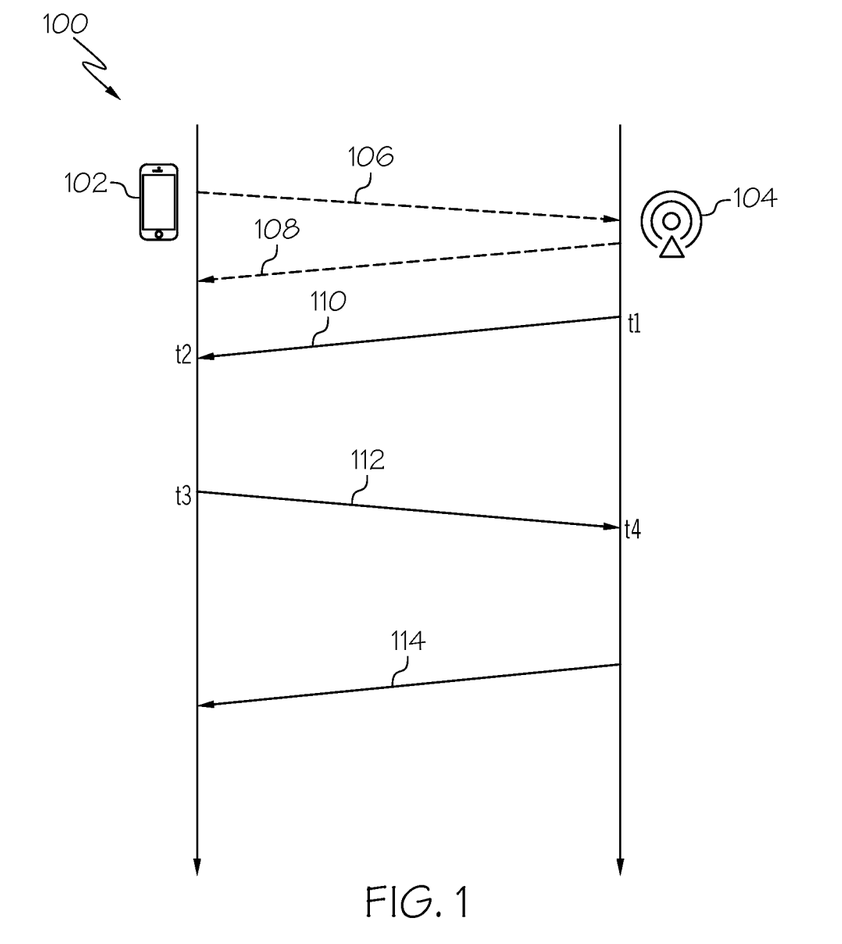
FIG. 1 schematically depicts an illustrative fine time measurement process, according to one or more embodiments shown and described herein.

Referring now to FIG. 1, a fine time measurement (FTM) process 100 is schematically depicted. The actions depicted in FIG. 1 occur in descending chronological order. The FTM process 100 is defined in the IEEE 802.11mc standard and enables a pair of Wi-Fi-enabled devices to estimate the distance between them. The FTM process 100 is a time-of-flight-based approach that calculates the time of flight of signals between devices to estimate the distance therebetween. The devices, for instance, may be a mobile device 102 and a Wi-Fi access point (AP 104). The mobile device 102 may be a smartphone, tablet, laptop, wearable, vehicle, or any other computing device capable of wireless communication. The mobile device 102 may request the FTM process 100 by sending a request message 106, to which the AP 104 may respond with a confirmation message 108 to confirm that the AP 104 will begin the FTM process 100. The AP 104 begins the FTM process 100 by transmitting an FTM message 110 at time t1, which is received by the mobile device 102 at time t2. The mobile device responds to the FTM message 110 with an acknowledgment message 112 at time t3, which is received by the AP 104 at time t4. The AP 104 may then calculate the distance between the AP 104 and the mobile device 102, where the distance is half of the difference between the total RTT and the turnaround time multiplied by the speed of the radio waves. More particularly, distance=$(((t_4-t_1)-(t_3-t_2))*c)/2$. The AP 104 may calculate the distance for a predetermined number of repetitions. The AP 104 then transmits the distance to the mobile device 102 in a final message 114.

However, interference may be introduced in real-world applications that may affect the distance calculation. The FTM message 110 and/or the acknowledgment message 112 may be blocked, preventing it from reaching its intended recipient. In which case, no distance may be calculated and the FTM message 110 must be re-sent. The FTM message 110 and/or the acknowledgment message 112 may also travel a non-line-of-sight path to the recipient, which may occur as the signal is propagated in every direction and reflected back to the recipient. The result of this multi-path phenomenon is the message traveling a longer than line-of-sight path. The more the signal deviates from a line-of-sight path, the more inaccurate the distance measurement may become.

Figure 2:
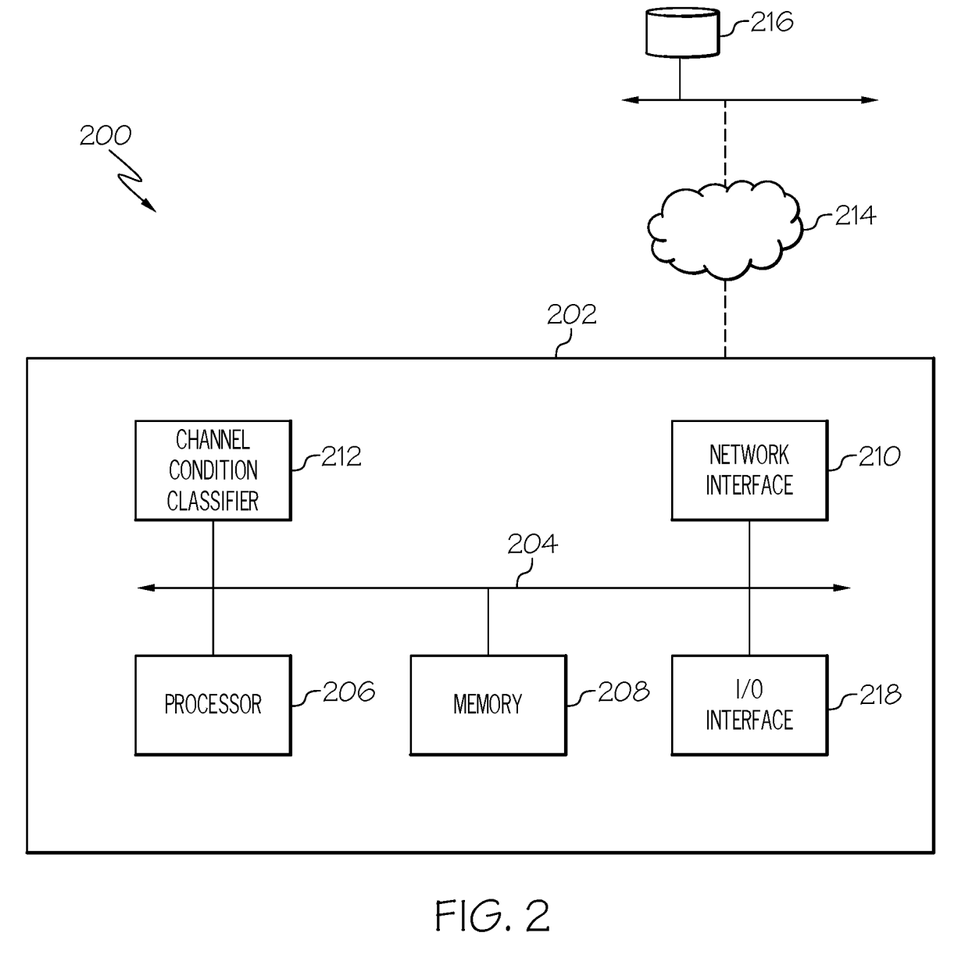
FIG. 2 schematically depicts an illustrative system, according to one or more embodiments shown and described herein.

Referring now to FIG. 2, a system 200 for performing augmented FTM as described herein is schematically depicted. The system 200 may include a computing device 202 for executing the methods described herein. The computing device 202 may be included in the AP 104 in FIG. 1. The computing device 202 may be an access point and may include a processor 206, memory 208, network interface 210, input/output interface (I/O interface 218), and channel condition classifier module 212. The computing device 202 also may include a communication path 204 that communicatively connects the various components of the computing device 202. The computing device 202 may connect to external computing devices 216 via a network 214. It should be understood that the components of the computing device 202 described are exemplary and may contain more or less than the number of components shown in FIG. 2.

The processor 206 may include one or more processors that may be any device capable of executing machine-readable and executable instructions. Accordingly, each of the one or more processors of the processor 206 may be a controller, an integrated circuit, a microchip, or any other computing device. The processor 206 is coupled to the communication path 204 that provides signal connectivity between the various components of the computing device 202. Accordingly, the communication path 204 may communicatively couple any number of processors of the processor 206 with one another and allow them to operate in a distributed computing environment. Specifically, each processor may operate as a node that may send and/or receive data. As used herein, the phrase "communicatively coupled" means that coupled components are capable of exchanging data signals with one another, such as, e.g., electrical signals via a conductive medium, electromagnetic signals via air, optical signals via optical waveguides, and/or the like.

The communication path 204 may be formed from any medium that is capable of transmitting a signal such as, e.g., conductive wires, conductive traces, optical waveguides, and the like. In some embodiments, the communication path 204 may facilitate the transmission of wireless signals, such as Wi-Fi, Bluetooth, Near-Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 208 is communicatively coupled to the communication path 204 and may contain one or more memory modules comprising RAM, ROM, flash memories, hard drives, or any device capable of storing machine-readable and executable instructions such that the machine-readable and executable instructions can be accessed by the processor 206. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and/or the like, that may be compiled or assembled into machine-readable and executable instructions and stored on the memory 208. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The I/O interface 218 is coupled to the communication path 204 and may contain hardware for receiving input and/or providing output. Hardware for receiving input may include devices that send information to the processor 206. For example, a keyboard, mouse, scanner, touchscreen, and camera are all I/O devices because they provide input to the processor 206. Hardware for providing output may include devices from which data is sent. For example, an electronic display, speaker, and printer are all I/O devices because they output data from the processor 206.

The computing device 202 also comprises the network interface 210. The network interface 210 is communicatively coupled to the communication path 204. The network interface 210 can be any device capable of transmitting and/or receiving data via a network or other communication mechanisms. Accordingly, the network interface 210 can include a communication transceiver for sending and/or receiving any wired or wireless communication. For example, the network interface 210 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices. The network interface 210 communicatively connects the computing device 202 to external systems, such as external computing devices 216, via a network 214. The network 214 may be a wide area network, a local area network, a personal area network, a cellular network, a satellite network, and/or the like.

The system 200 may also include external computing devices 216. The external computing devices 216 may be one or more computing devices that may be in remote communication with the computing device 202 via network 214. The external computing devices 216 may include devices that operate beyond the computing device 202, such as desktop computers, smartphones, access points, routers, and any other type of computing device in communication with the computing device 202. The external computing devices 216 may also include services that operate beyond the computing device 202 that may be utilized by or may utilize the computing device 202, such as external databases, storage devices, computing platforms, and/or any other type of service. The external computing devices 216 may request FTM from the computing device 202.

The channel condition classifier module 212 may be a hardware module coupled to the communication path 204 and communicatively coupled to the processor 206. The channel condition classifier module 212 may also or instead be a set of instructions contained in the memory 208. The channel condition classifier module 212 is configured to receive FTM messages, extract CSI information from FTM messages, classify FTM messages as likely multi-path or line-of-sight dominant, and determine whether to discard or keep classified FTM messages. The channel condition classifier module 212 may be further configured to train and/or utilize a machine learning module to classify the FTM messages. The channel condition classifier module 212 may utilize supervised methods to train a machine learning model based on labeled training sets, wherein the machine learning model is a decision tree, a Bayes classifier, a support vector machine, a convolutional neural network, and/or the like. In some embodiments, channel condition classifier module 212 may utilize unsupervised machine learning algorithms, such as k-means clustering, hierarchical clustering, and/or the like. The channel condition classifier module 212 may also be configured to perform the methods described herein.

It should be understood that the components illustrated in FIG. 2 are merely illustrative and are not intended to limit the scope of this disclosure. More specifically, while the components in FIG. 2 are illustrated as residing within computing device 202, this is a non-limiting example. In some embodiments, one or more of the components may reside external to computing device 202. In some embodiments, the computing device 202 may exist as a virtual machine operating within a host machine alongside other virtual machines, each of which shares the same computing resources belonging to the host machine.

Figure 3:
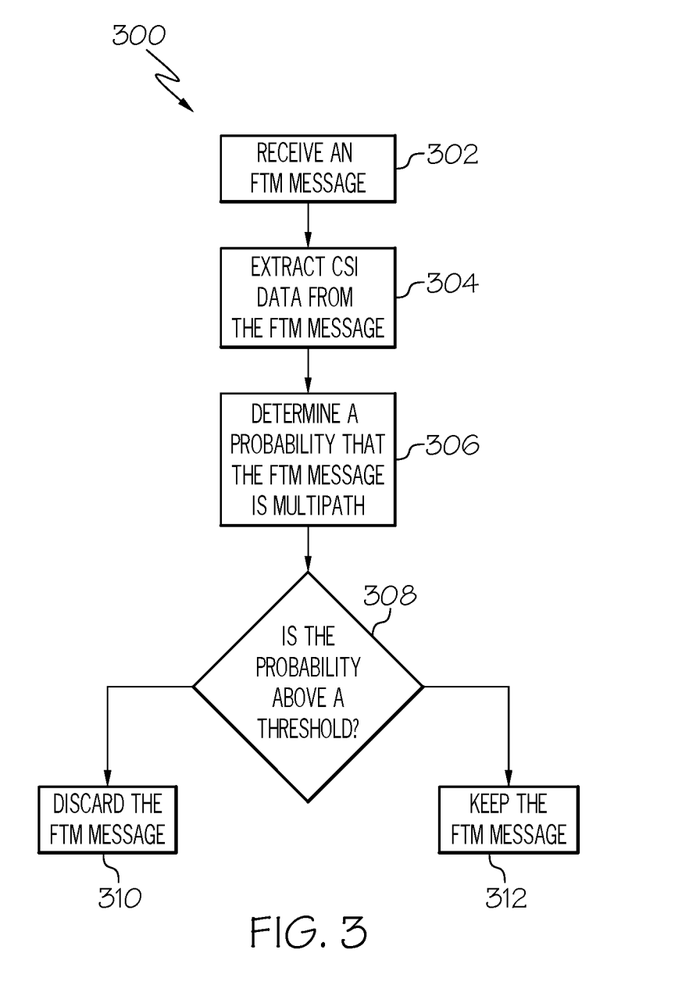
FIG. 3 depicts an illustrative flowchart of a method, according to one or more embodiments shown and described herein.

Referring now to FIG. 3, a flowchart of a method 300 for FTM is depicted. The method 300 may be performed by an AP or any other wireless-enabled device. In block 302, the AP receives one or more FTM messages. The AP may have a network interface (e.g., network interface 210) for receiving the FTM messages and memory (e.g., memory 208) for storing the FTM messages. In some embodiments, the AP may store multiple FTM messages to perform multiple FTMs for a device and/or one or more other devices simultaneously.

In block 304, the AP extracts CSI from the FTM messages (e.g., FTM message 110). The AP may have a processor (e.g., processor 206) for extracting the CSI from the FTM messages. CSI may be represented as a multi-dimensional (e.g., three-dimensional) matrix of values of amplitude attenuation over domains comprising frequency and time. A Wi-Fi channel with multiple-input multiple-output (MIMO) is divided into multiple subcarriers by orthogonal frequency-division multiplexing (OFDM). The result is a plurality of subcarriers in the frequency domain. The time domain may be represented by a unit of time, a set of steps, a set of packets, or the like. A Wi-Fi system of an AP may provide CSI to represent how wireless signals propagate from the transmitter to the receiver at various frequencies. For example, multi-path behavior may be indicated by a wide degree of variation in amplitude along the subcarriers of a frequency.

In block 306, the AP determines a probability that an FTM message is multi-path. The AP may have a channel condition classifier (e.g., channel condition classifier module 212) for determining a probability that an FTM message is multi-path. The channel condition classifier analyzes CSI corresponding to an FTM message to determine a probability that it is multi-path. A machine learning model may perform the analysis. The machine learning model may perform unsupervised or supervised methods for determining probabilities of being multi-path.

As one example, the channel condition classifier may utilize unsupervised machine learning algorithms, such as k-means clustering, hierarchical clustering, and/or the like. An unsupervised machine-learning-based channel condition classifier may identify one or more probability levels and create one or more centroids corresponding to the one or more probability levels. The one or more probability levels may correspond to different ranges of probability. For example, five probability levels may be created, each representing a 20% increment between 0% and 100%. The multi-dimensional grid may have the same number of dimensions as the CSI and be divided into sections corresponding to the percentage increment of the probability levels. For example, the multi-dimensional grid may be a three-dimensional grid divided into five sections such that the first section represents CSI that would be considered 0% to 20% likely to be multi-path, the second section presents CSI that would be considered 20% to 40% likely to be multi-path, and so on. The centroids may be placed randomly in their respective sections and the FTM messages may be clustered according to the centroid placement. After clustering has been performed, the channel condition classifier may determine the probability level of one or more FTM messages. An FTM message may have a probability level of its cluster's centroid. Alternatively, an FTM message may have a probability level of the section of the multi-dimensional grid it occupies the most. After the probability level has been determined, the probability that the FTM message is multi-path may be estimated by assigning it a probability within the probability level. For example, if an FTM message is in a 0% to 20% probability level, then the probability that the FTM message is multi-path may be a value between 0% and 20%. For simplicity, the probability of the FTM messages of a cluster may all be the lowest, middle, or highest values of the probability level. Alternatively, the probability of the FTM messages corresponds to the distance from the lowest, middle, or highest values of the probability level.

As another example, the channel condition classifier may utilize supervised methods to train a machine learning model based on labeled training sets. The machine learning model may be a decision tree, a Bayes classifier, a support vector machine, a convolutional neural network, or any other machine learning data structure. A supervised machinelearning-based channel condition classifier may receive a dataset of a plurality of FTM messages and label one or more of the FTM messages in the dataset with an appropriate probability level to create a training data set. For example, the channel condition classifier may take known instances of multi-path FTM messages and label them in the probability level having 100% and/or take known instances of line-of-sight FTM messages and label them in the probability level having 0%. The plurality of FTM messages may be from a variety of distances from the location of the AP. The channel condition classifier may train a machine learning model with all or some of the training dataset. Methods for training may include, for example, gradient-based algorithms. Some of the training dataset may be reserved for training validation. After the machine learning model has been trained, the channel condition classifier may provide FTM messages as input to the machine learning model to determine the probability that the FTM message is multi-path-based.

In block 308, the AP determines whether the probability is above a threshold level of probability. The threshold level may be predetermined or dynamic. A predetermined threshold level may include a percentage or classifications that correspond to a percentage. For example, the channel condition classifier may be user-configurable and have sensitivity settings, such as high, medium, and low, wherein high has a threshold that filters FTM messages having a probability of being multi-path-based above 25%, medium has a threshold that filters FTM messages having a probability of being multi-path-based above 50% and low has a threshold that filters FTM messages having a probability of being multi-path-based above 75%. A dynamic level may include a percentage that adjusts based on factors such as network congestion, number of connected devices, number of FTM messages received, and/or any other network-related condition.

In block 310, the AP discards the FTM message in response to determining that the probability is above the threshold level. In block 312, the AP keeps the FTM message in response to determining that the probability is below the threshold level. If the FTM message is kept, the AP may calculate a distance between the AP and the transmitter of the FTM message based on the kept FTM message and then transmit the result to the transmitter. The AP may perform method 300 for each FTM.

In some embodiments, rather than performing an FTM for each FTM message, the AP may perform a single FTM for multiple FTM messages. To perform a single FTM for multiple FTM messages from the same transmitter, the AP may average the RTT and/or turnaround time of multiple FTM messages and/or acknowledgment messages, excluding discarded FTM messages. The AP may then calculate the distance between the AP and the transmitter based on the average RTT and/or average turnaround time.

Figure 4A:
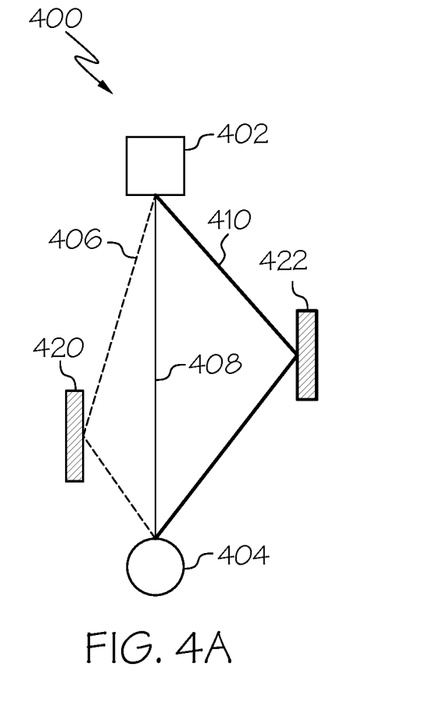
FIG. 4A depicts three signal propagations from a transmitter to a receiver, according to one or more embodiments shown and described herein.

Referring now to FIG. 4A, a scenario 400 includes three paths 406, 408, 410 of a signal from a transmitter 402 to a receiver 404. The transmitter may be a mobile device, such as mobile device 102, and the receiver may be an AP, such as AP 104. Because a signal radiates in multiple directions from a transmitter, a signal may travel in multiple paths before arriving at the receiver 404. The most direct path is the second path 408 because it travels directly in a line-of-sight path. Multi-path signals travel indirectly to the receiver 404 after reflecting and/or diffracting off of various surfaces between the transmitter 402 and receiver 404. For example, the first path 406 and third path 410 are multi-path because they are reflected off a first surface 420 and a second surface 422, respectively, before arriving at the receiver 404. The receiver 404 calculating a distance to the transmitter 402 may be performing FTM with FTM messages from the second path 408 because it is the shortest path, and thus the FTM messages arriving from signals on the second path 408 are used for performing FTM. However, if a passing object, for example, prevents an FTM message from arriving at the receiver 404 via the second path 408, the FTM message may arrive at the receiver 404 via the first path 406 or third path 410. FTM messages arriving at the receiver 404 via the first path 406 or third path 410 take longer to arrive and may introduce noise in the FTM.

Figure 4B:
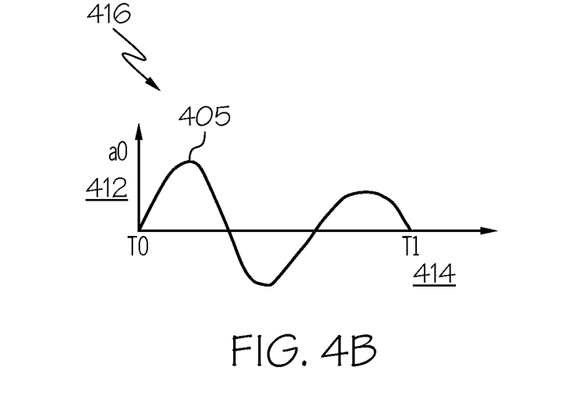
FIG. 4B depicts the strength of a signal from a transmitter of FIG. 4A over time, according to one or more embodiments shown and described herein.

Referring now to FIG. 4B, a graph 416 of the strength 412 of a signal 405 from a transmitter 402 over time 414 is depicted. The transmitter 402 may begin transmitting the signal 405 at time t0 and end transmission at time t1. Between time t0 and time t1, the signal may have a maximum amplitude a0.

Figure 4C:
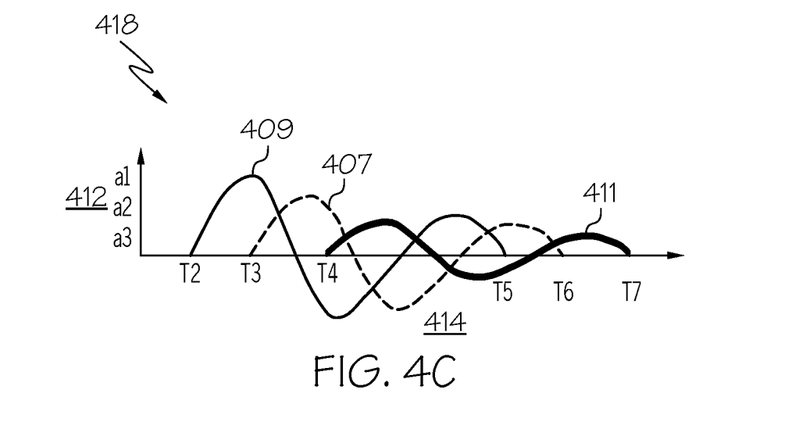
FIG. 4C depicts the strength of the three signals received from the transmitter of FIG. 4A over time, according to one or more embodiments shown and described herein.

Referring now to FIG. 4C, a graph 418 of the strength 412 of the signals 407, 409, 411 received from the transmitter 402 over time 414 is depicted. The signals 407, 409, 411 may travel paths 406, 408, 410, respectively. Because it travels on path 408 (i.e., line-of-sight), the signal 409 arrives at the receiver 404 first. The signal 409 arrives at a time t2, which is after t0, for a travel time of t2-t0. The signal 407 arrives at the receiver 404 second at a time t3, after time t0 and t2. The signal 411 arrives at the receiver 404 third at a time t4, after time t0, t2, and t3.

The receiver 404 may have a channel condition classifier for determining whether an FTM message of a signal is likely multi-path. Without knowing the transmitted signal 405, a machine learning model of the channel condition classifier may be configured (e.g., trained) to recognize or estimate features of a signal that may indicate a signal being likely multi-path or line-of-sight. Features may include signal starting time (i.e., arrival time), ending time, length, amplitude, and/or other signal characteristics. The more that a received signal varies from the transmitted signal in the features, the more likely that a signal is multi-path. A multi-path signal may arrive later and end later, be longer, and have lower amplitudes than a line-of-sight signal. For example, amplitudes a2 and a3 of signals 407, 411, respectively, are less than amplitude a1 of the line-of-sight signal 409. Additionally, the lengths (t6-t3) and (t7-t4) of signals 407, 411, respectively, are less than the length (t5-t2) of the line-of-sight signal 409.

The training data may include FTM messages from signals at various distances. For example, signals 407, 409, 411 may be training data for the receiver 404 at the distance, as shown in scenario 400. After signals 407, 409, 411 are received for training the receiver 404, the signals 407, 409, 411 may be labeled as 0% likely multi-path to 100% likely multi-path. For example, signal 409 may be labeled as 0% likely multi-path because it traveled path 408 (i.e., line-of-sight), whereas signals 407, 411 may be labeled as 100% likely multi-path because they traveled paths 406, 410, respectively. Accordingly, when a receiver 404 having a trained machine learning model receives signals 407, 409, 411, signals 407, 411 may be discarded in an FTM.

Figure 5A:
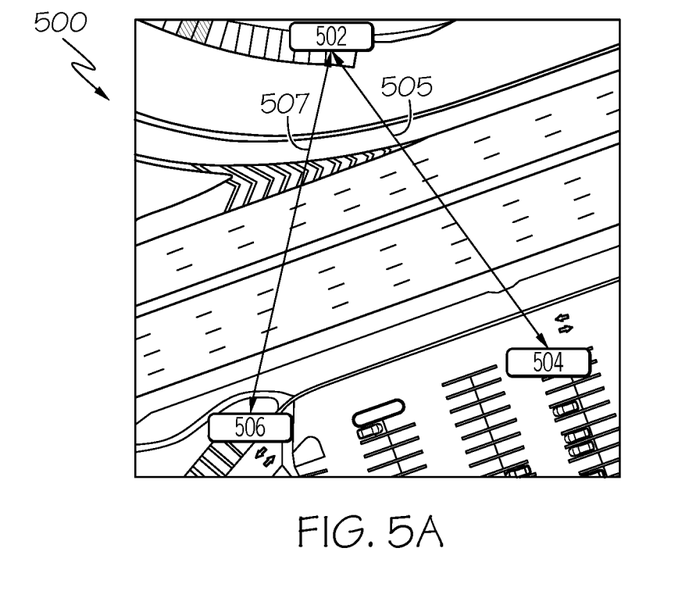
FIG. 5A depicts an illustrative scenario with one AP and two mobile devices, according to one or more embodiments shown and described herein.

Referring now to FIG. 5A, a scenario 500 with an AP 502 and mobile devices 504, 506 is depicted. Mobile devices 504, 506 may be communicatively connected to the AP 502 via, for example, Wi-Fi. The mobile device 504 is a distance 505 from the AP 502, and the mobile device 506 is a distance 507 from the AP 502. The AP 502 may first receive one or more FTM messages from the mobile devices 504, 506. The AP 502 may then extract CSI from the FTM messages. To augment the FTM, a machine-learning-based channel condition classifier of the AP 502 may receive the CSI and determine a probability that the FTM message corresponding to the CSI is multi-path. If the probability that the FTM message is multi-path is above a threshold level, then the FTM message may be discarded. Otherwise, the FTM message may be kept, and the AP 502 may continue the FTM to estimate distances 505, 507.

Figure 5B:
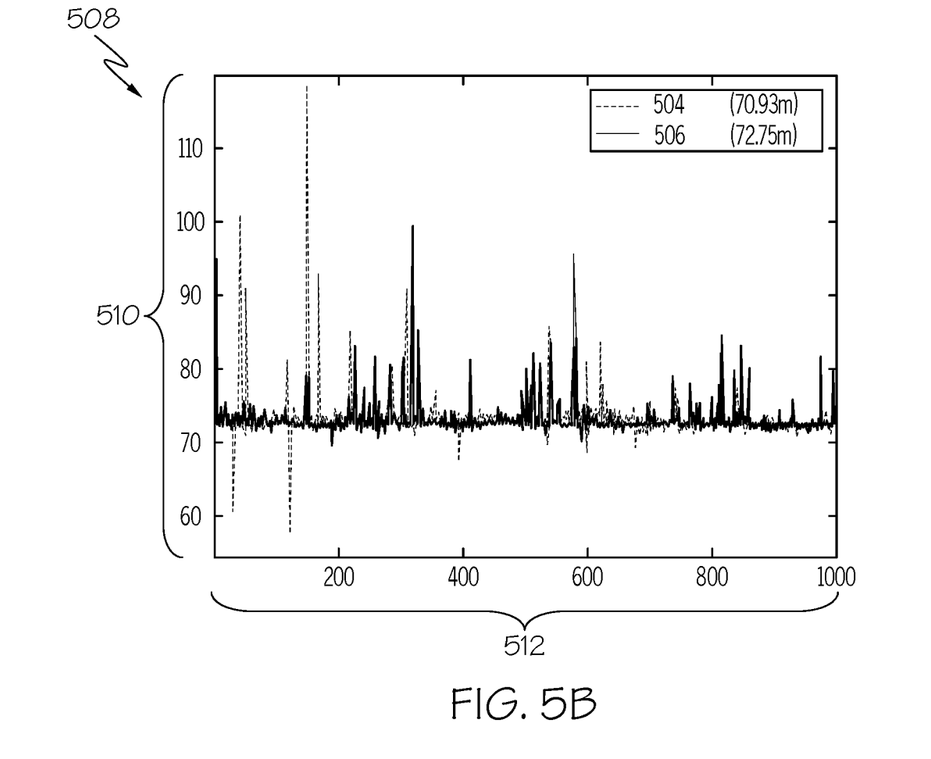
FIG. 5B depicts a graph of the estimated distance between the AP and mobile devices of FIG. 5A over time without augmented FTM, according to one or more embodiments shown and described herein.

Referring now to FIG. 5B, a graph 508 of estimated distance 510 between the AP 502 and mobile devices 504, 506 over time 512 is depicted. The graph 508 is a visual representation of the estimated distance 510 via FTM performed for each unit of time 512. The distance 505 may be 70 meters and the distance 507 may be 72 meters. In ideal conditions, the FTMs performed by the AP 502 should be equivalent to the actual distances. However, environmental conditions may cause multi-path FTM messages to arrive at the AP 502 before the line-of-sight FTM message, causing some FTMs to provide inaccurate results. For example, before timestamp 200 of the time 512, the distance 505 to mobile device 504 was twice estimated by the AP 502 to be over 100 meters. By contrast, the distance 507 to mobile device 506 did not have such significant variations in the estimated distance 510 before the timestamp 200 of the time 512. This may be due to passing cars in the parking lot where the mobile device 504 is located, blocking all but the most multi-path-bound FTM messages. Nevertheless, both mobile devices 504, 506 had more frequent yet more minor variations in the estimated distance 510 throughout the time 512 likely due to passing cars on the highway between the AP 502 and mobile devices 504, 506.

Figure 5C:
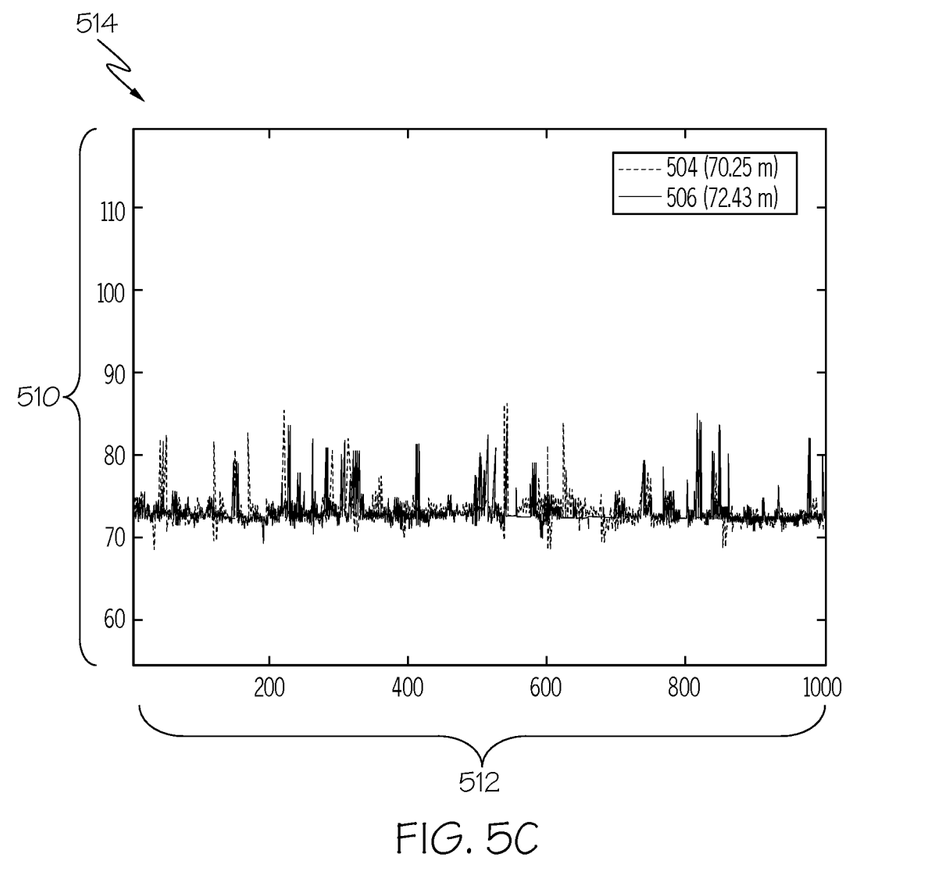
FIG. 5C depicts a graph of the estimated distance between the AP and mobile devices of FIG. 5A with augmented FTM, according to one or more embodiments shown and described herein.

Referring now to FIG. 5C, a graph 514 of estimated distance 510 between the AP 502 and mobile devices 504, 506 over time 512 is depicted. The graph 514 is a visual representation of the estimated distance 510 via augmented FTM performed for each unit of time 512. The augmented FTM may be performed by the AP 502 according to method 300 and with regard to FIG. 5A, discussed above. The result of the augmented FTM is the elimination of likely multi-path FTM messages. Multi-path FTM messages may provide distance estimates that are significantly above the actual distance. For example, before timestamp 200 of the time 512, the distance 505 to mobile device 504 was twice estimated by the AP 502 to be over 100 meters, which was since eliminated after applying augmented FTM. The elimination of likely multi-path FTM messages improves the averaged distance measurements for the distance 505 to mobile device 504 and distance 507 to mobile device 506. For example, the distance 505 may have improved from 70.93 meters to 70.25 meters, and the distance 507 may have improved from 72.75 meters to 72.43 meters.

It should now be understood that embodiments disclosed herein include methods, systems, and non-transitory mediums having machine-readable instructions for improving the accuracy of the FTM protocol. Embodiments of the present disclosure may perform augmented FTM by determining which RTT measurements are likely multi-path and discarding them to allow for a cleaner average RTT measurement and thus a more accurate ranging calculation. Embodiments may include a machine-learning-based channel condition classifier for analyzing the CSI of an FTM message to determine a probability that an FTM message is multi-path.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open-ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

For the purposes of describing and defining embodiments of the present disclosure, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method comprising:
   receiving a fine time measurement (FTM) message;
   extracting channel state information (CSI) from the FTM message;
   determining with a channel condition classifier a probability that the FTM message is multi-path based on the corresponding CSI; and
   discarding the FTM message in response to the probability that the FTM message is multipath is above a threshold level of probability,
   wherein the channel condition classifier includes a machine learning model for determining the probability that the FTM message is multi-path.

2. The method of claim 1, wherein determining the probability that the FTM message is multipath comprises:
   identifying one or more probability levels;
   creating one or more centroids corresponding to the one or more probability levels;

clustering the FTM message based on the one or more centroids;
determining the probability level based on the cluster of the FTM message; and
determining the probability that the FTM message is multi-path based on the probability level.

3. The method of claim 1, wherein determining the probability that the FTM message is multipath comprises:
generating a dataset of a plurality of FTM messages;
labeling one or more FTM messages of the plurality of FTM messages with a probability level to create a training dataset;
training the machine learning model based on the training dataset; and
determining the probability that the FTM message is multi-path based on the trained machine learning model.

4. The method of claim 1, wherein the threshold level of probability is based on a number of FTM messages received.

5. The method of claim 1, further comprising averaging a round trip time (RTT) of one or more received FTM messages, excluding the discarded FTM message.

6. The method of claim 5, wherein the probability that each of the one or more received FTM messages is multi-path is at or below the threshold level of probability.

7. The method of claim 5, further comprising estimating a distance from a transmitter of the FTM message to a receiver of the FTM message based on the averaged RTT.

8. A system comprising:
a controller programmed to perform operations comprising:
receiving a fine time measurement (FTM) message;
extracting channel state information (CSI) from the FTM message;
determining with a channel condition classifier a probability that the FTM message is multi-path based on the corresponding CSI; and
discarding the FTM message in response to the probability that the FTM message is multi-path is above a threshold level of probability,
wherein the channel condition classifier includes a machine learning model for determining the probability that the FTM message is multi-path.

9. The system of claim 8, wherein:
determining the probability that the FTM message is multi-path comprises:
identifying one or more probability levels;
creating one or more centroids corresponding to the one or more probability levels;
clustering the FTM message based on the one or more centroids;
determining the probability level based on the cluster of the FTM message; and
determining the probability that the FTM message is multi-path based on the probability level.

10. The system of claim 8, wherein determining the probability that the FTM message is multi-path comprises:
receiving a dataset of a plurality of FTM messages;
labeling one or more FTM messages of the plurality of FTM messages with a probability level to create a training dataset;
training the machine learning model based on the training dataset; and
determining the probability that the FTM message is multi-path based on the trained machine learning model.

11. The system of claim 8, wherein the controller is programmed to perform operations further comprising averaging a round trip time (RTT) of one or more received FTM messages, excluding the discarded FTM message.

12. The system of claim 11, wherein the probability that each of the one or more received FTM messages is multi-path is at or below the threshold level of probability.

13. The system of claim 11, wherein the controller is programmed to perform operations further comprising estimating a distance from a transmitter of the FTM message to a receiver of the FTM message based on the averaged RTT.

14. A non-transitory medium having machine-readable instructions that, when executed by a processor, cause the processor to perform operations comprising:
receiving a fine time measurement (FTM) message;
extracting channel state information (CSI) from the FTM message;
determining with a channel condition classifier a probability that the FTM message is multi-path based on the corresponding CSI; and
discarding the FTM message in response to the probability that the FTM message is multipath is above a threshold level of probability,
wherein the channel condition classifier includes a machine learning model for determining the probability that the FTM message is multi-path.

15. The non-transitory medium of claim 14, wherein determining the probability that the FTM message is multi-path comprises:
identifying one or more probability levels;
creating one or more centroids corresponding to the one or more probability levels;
clustering the FTM message based on the one or more centroids;
determining the probability level based on the cluster of the FTM message; and
determining the probability that the FTM message is multi-path based on the probability level.

16. The non-transitory medium of claim 14, wherein determining the probability that the FTM message is multi-path comprises:
receiving a dataset of a plurality of FTM messages;
labeling one or more FTM messages of the plurality of FTM messages with a probability level to create a training dataset;
training the machine learning model based on the training dataset; and
determining the probability that the FTM message is multi-path based on the trained machine learning model.

17. The non-transitory medium of claim 14, wherein the machine-readable instructions cause the processor to perform operations further comprising averaging a round trip time (RTT) of one or more received FTM messages, excluding the discarded FTM message.

18. The non-transitory medium of claim 17, wherein the probability that each of the one or more received FTM messages is multi-path is at or below the threshold level of probability.

19. The non-transitory medium of claim 17, wherein the machine-readable instructions cause the processor to perform operations further comprising estimating a distance from a transmitter of the FTM message to a receiver of the FTM message based on the averaged RTT.

* * * * *